July 11, 1967     P. N. SONNENBURG     3,330,222
HALF SLIPPER AND BEAM FOR GLIDING TRACK VEHICLE
Filed March 19, 1965     3 Sheets-Sheet 1
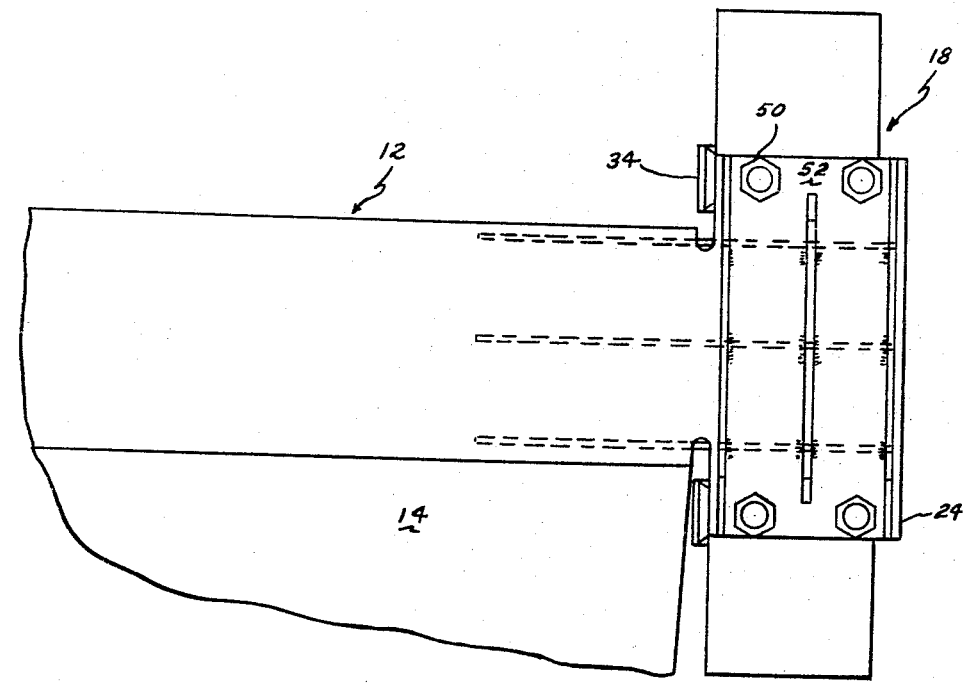
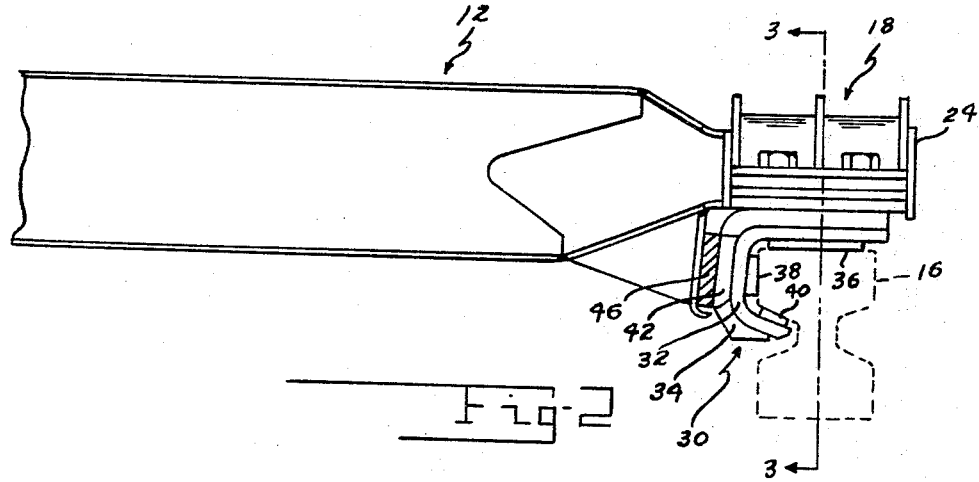
INVENTOR.
PAUL N. SONNENBURG
BY Harry A. Herbert Jr.
Louis E. Hay
ATTORNEYS

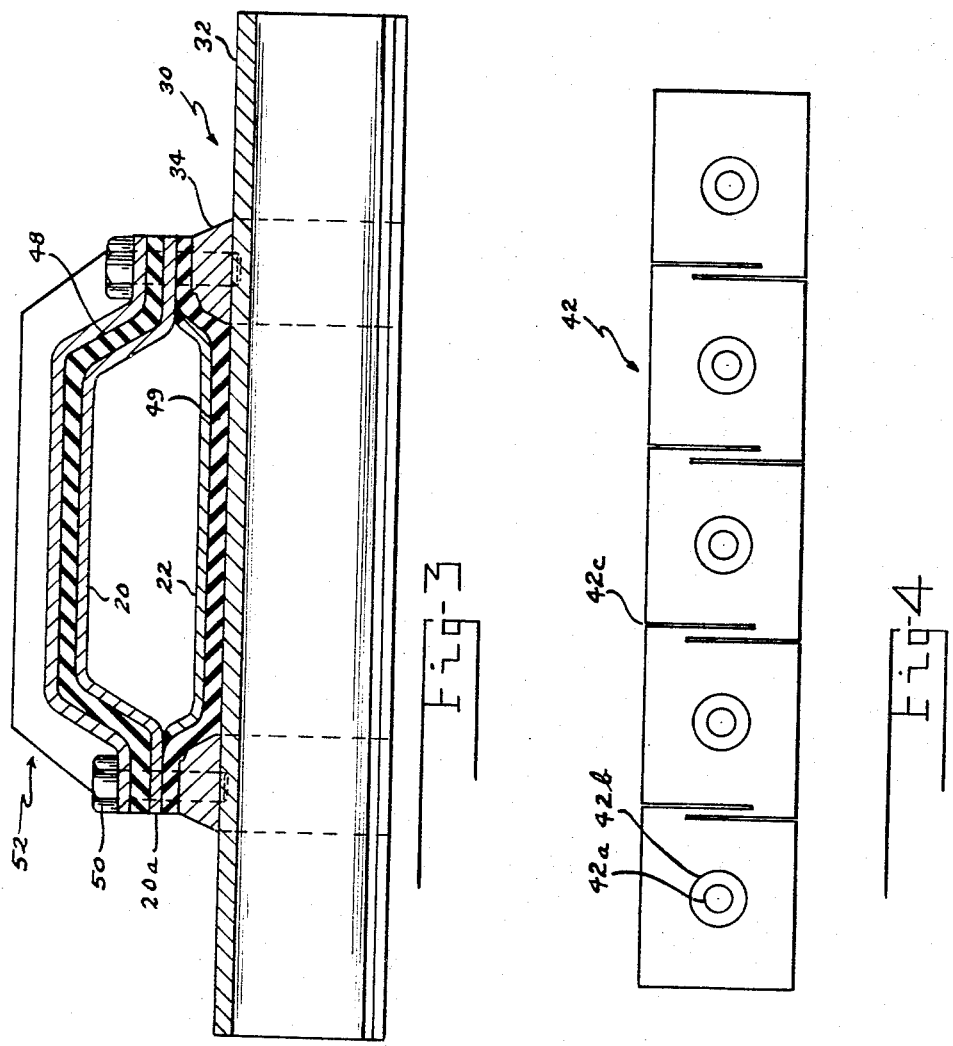

July 11, 1967 P. N. SONNENBURG 3,330,222
HALF SLIPPER AND BEAM FOR GLIDING TRACK VEHICLE
Filed March 19, 1965 3 Sheets-Sheet 3

INVENTOR.
PAUL N. SONNENBURG
BY Harry A. Herbert Jr.
Louis E. Way
ATTORNEYS

United States Patent Office 3,330,222
Patented July 11, 1967

3,330,222
HALF SLIPPER AND BEAM FOR GLIDING TRACK VEHICLE
Paul N. Sonnenburg, Alamogordo, N. Mex., assignor to the United States of America as represented by the Secretary of the Air Force
Filed Mar. 19, 1965, Ser. No. 441,390
3 Claims. (Cl. 104—134)

ABSTRACT OF THE DISCLOSURE

In combination, a longitudinal beam structure for laterally supporting a gliding track vehicle and terminating at each end in a substantially rectangular end superimposed over one rail of the track on which the gliding track vehicle is propelled; and, at each end of the beam structure, a detachable downward extending half slipper detachably and resiliently supported at the upper portion by the rectangular end of the beam structure, the downward extending end of each half slipper being substantially C-shaped to engage the upper and inside face of the rail.

---

The invention described herein may be manufactured and used by or for the United States Government for governmental purposes without the payment to me of any royalty thereon.

This invention relates to high-speed track-supported land vehicles operable on tracks at speeds up to and including supersonic speeds. More specifically, this invention relates to slipper assemblies for slidably retaining such a land vehicle on the track.

High-speed land vehicles are extensively used as test beds in the conduct of vast amounts of research associated with high-speed flight. Such vehicles are especially useful in the conduct of acceleration and deceleration tests; not only in regard to propulsion systems, but also in regard to their effect on the human anatomy.

It became apparent at the very inception of high-speed test programs that wheeled vehicles could not be used for this purpose because wheels could not tolerate the rapid acceleration, and because the motion of the vehicle during high-speed operation would produce separation from the track. At the present time, glider vehicles, called "sleds," are used as test beds. These sleds have slippers which slidably rest on the track while, at the same time, embracing the upper railhead portion of the track for the purpose of producing stability, and for preventing track separation.

Heretofore, the customary slippers used on sleds were "full slippers" having jaws engaging both sides of the railhead portion of the track. Nothing is wrong with the full slippers in the manner in which they permit the sled to function; however, as will be shown, the half slipper constituting this invention will function as well; and in addition have certain pronounced advantages over full slippers.

It is, accordingly, one object of this invention to provide a slipper device for use on gliding track vehicles which may be easily and rapidly detached when it is desired to lift the vehicle from the track.

Another object of this invention is to provide a slipper device which, when detached from the sled, may be removed from the track without partial disassembly of the slipper; or, in the alternative, dragging the slipper to the end of the track for removal therefrom.

A further object of this invention is to provide a slipper which can be field manufactured and repaired without the necessity for precision machine tools.

An additional object of this invention is to provide a slipper for use on gliding vehicles in which vibrations and shock loads are not transmitted to the sled structure.

And yet a further object of this invention is to provide a slipper which will dampen vibration and shock loads without the use of springs or cushioning devices using moving mechanical elements.

A still additional object of this invention is to provide a slipper for use on gliding vehicles which will permit the removal of the gliding vehicle and all slippers from the track in the minimum amount of time.

Yet another object of this invention is to provide a slipper which will permit a significant reduction in manhour requirements for carrying on routine sled operations.

Additional objects, advantages and features of the invention reside in the construction, arrangement and combination of parts involved in the embodiment of the invention as will appear from the following description and accompanying drawings, wherein FIG. 1 is a plan view of the beam portion of the gliding vehicle with the slipper assembly operably attached to the beam;

FIG. 2 is a front elevation of the structure shown on FIG. 1 and showing the slipper engaging the track;

FIG. 3 is an enlarged section taken on line 3—3 of FIG. 2, with the guide plates omitted for clarity;

FIG. 4 is an enlarged detail of a typical guide plate; or, in the alternative, the side load plate;

Figure 5:
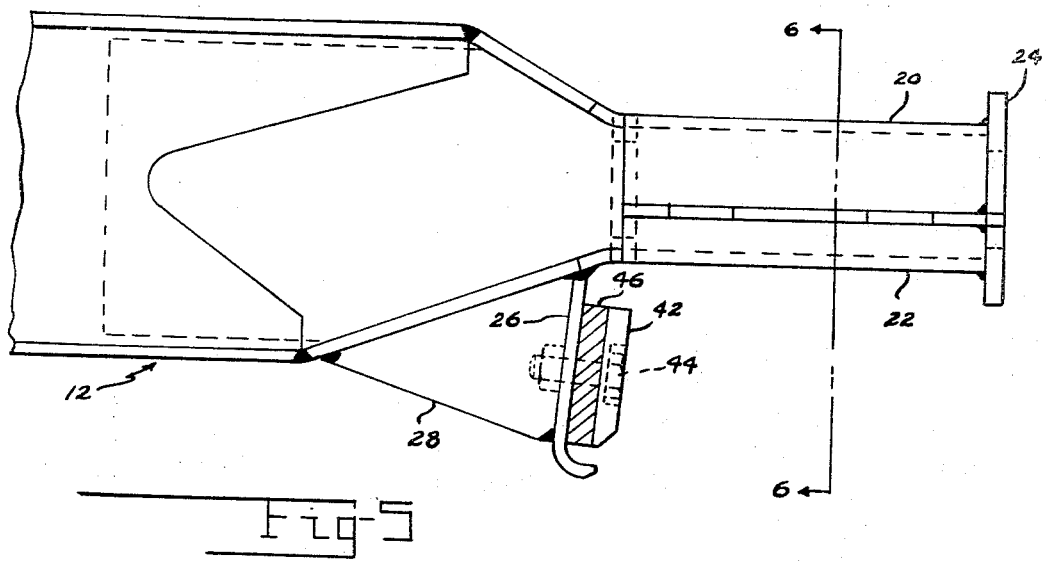
FIG. 5 is an enlarged side elevation of the slipper beam end and showing in particular the side load plate attached to the beam.

Referring to the drawings, and specifically to FIG. 1, FIG. 2, and FIG. 5, the half slipper and beam assembly comprises, in its most simple terms, a beam 12 adapted at the central portion for joining to the bottom portion of the gliding vehicle 14 and terminating in ends laterally extending from the vehicle to be above the ground track 16 on which the gliding vehicle operates, and a half slipper assembly 18 removably joined to the end of the beam and engaging the ground track as shown on FIG. 2. Although only one beam and one half slipper assembly are shown on the drawings, each gliding vehicle has two beams and four slipper assemblies, substantially at the four corner areas of the vehicle.

Figure 6:
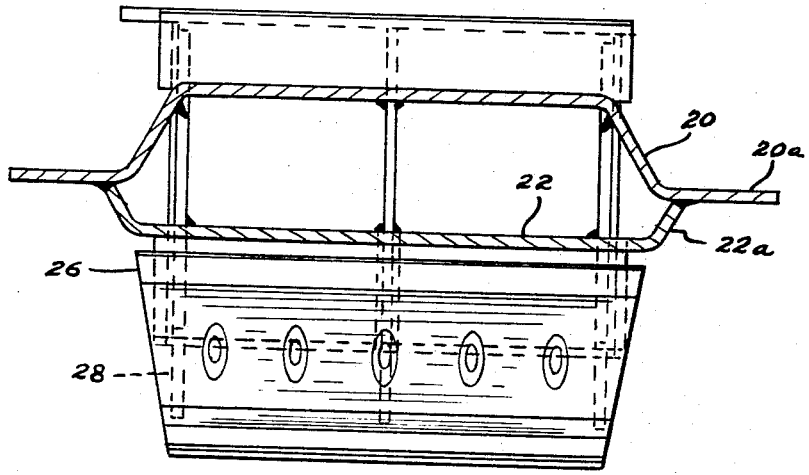
FIG. 6 is a vertical section taken on line 6—6 of FIG. 5.

As best shown on FIG. 5 and FIG. 6, the beam may conveniently be in the form of a box-structure weldment made of suitable structural elements welded in place and normalized after welding. The major central portion of the beam may be of any convenient form suitable for attaching to the vehicle. The end portions of the beam, which receive the half slipper assemblies, are the only portions of the beam requiring a specific configuration.

The end portions of the beam are configured to perform two primary functions: (1) to non-rotatably retain the slipper assembly, and (2) to provide lateral, longitudinal, and vertical support to the slipper assembly when the vehicle is in operation. The two primary structural elements of the end portions of the beam are the upper plate 20 and the lower plate 22. The inner end on both the upper plate and the lower plate blend into and are joined to the central portion of the beam by welding, as shown on FIG. 5. The outer end of both the upper plate and the lower plate have substantially parallel top and bottom surfaces, one each of which is above and below the longitudinal axis of the beam in such manner that the end portions form an integral part of the beam.

A cross section of the end portions of the beam is shown on FIG. 3 and FIG. 6. The upper plate 20 has a hat-section elongated central portion which is lateral to the longitudinal axis of the beam to be substantially parallel with the ground track on which the vehicle is to operate. The hat-section central portion at each side blends into horizontally flat sides 20a which provide retaining and support structure for the half slipper assembly elements to be hereinafter described. The lower plate 22 has turned up sides 22a which may be welded to the inner portions of the flat sides 20a on upper plate 20 as shown on FIG. 6. The turned up sides may, if desired, be welded further inward, as in the region where the hat-section of the upper plate blends into the flat sides. The major requirement in this respect is that the flat sides of the upper plate extend a sufficient amount to provide an adequate supporting surface for the half slipper assembly to be described.

The cross-sectional structure of the beam ends shown and described is substantially an unsymmetrical hexagon with the longest sides on the top and bottom. For want of a better term, the beam ends which support the half slipper assemblies may be described as an unsymmetrical hexagonal hollow prism. The cross-sectional structure of the beam ends may be any noncircular form which will support the applied load and which will prevent slipper rotation on the beam.

The outer open ends of the beam structure shown and described may be closed with end plates 24 which are welded in place. The end plates are not a necessary portion of the beam structure and may be omitted if desired; the outer face of the end plates do however provide a convenient surface on which desired instrumentation, such as accelerometers and velocity meters, may be mounted.

The beam provides lateral support to the half-slipper assemblies, to be described, by means of a side load pad 26 which is welded to the lower portion of the main beam structure as best shown on FIG. 5. The side load pad is joined to be lateral with the longitudinal axis of the beam, in order to be parallel with the ground track on which the vehicle is to operate, and is tilted to parallel the side of the upper railhead portion of the track. Suitable gussets 28 are provided. The lower edge of the side load pad 26 is preferably bent outward, as shown on FIG. 5, for a purpose which can be subsequently described with better clarity.

Referring to FIG. 2 and FIG. 3, the half slipper 30 consists of a slipper shoe 32 with a suitable number of reinforcing ribs 34. The slipper shoe may be hot-bent from steel stock of appropriate thickness. The slipper shoe is rather elongated as shown on FIG. 3 and is bent to the shape shown on FIG. 2; that is, the upper portion of the shoe is parallel to the upper surface of the ground rail, and the side is bent to embrace one side of the railhead portion of the track. The shoe may be made to embrace the outer side of the track within the spirit of this invention; however, for practical purposes it is better to embrace the inner side as shown. The reinforcing ribs 34 may be two or more in number, and may also be bent from suitable steel stock, and are welded in place on the exterior surfaces of the slipper shoe as shown on FIG. 2. In the particular configuration shown on FIG. 3, two reinforcing ribs are longitudinally located on the slipper shoe in the relative position shown, and for a purpose which will be subsequently explained in more detail. More reinforcing ribs may be used if desired. Such ribs may or may not be identical with ribs 34, and may be placed as desired so long as they do not interfere with the structure shown on FIG. 3.

Actual contact with the track is made by means of guide plates 36, 38, and 40, as shown on FIG. 2. Although the guide plates are shown to be of different widths, they may all be of substantially the same configuration shown on FIG. 4 and be of a length equal to the abutting member to which they are joined. Likewise, the side load plate 42, which is best shown on FIG. 5, may be of the same configuration as the guide plates 36, 38, and 40. For the purpose of illustration, the element shown on FIG. 4 will be referred to as side load plate 42; however, it is to be understood that the element shown may also be guide plates 36, 38, and 40.

The side load plate 42 may be made of flat steel bar stock having a plurality of drilled holes 42a for receiving the shanks of retaining bolts 44, as shown on FIG. 5, and having counterbores 42b for receiving the bolt heads on the retaining bolts. Both the drilled holes 42a and the counterbores 42b are of sufficient diameter to prevent bolts 44 from receiving shear stress when the side load plate 42 is under thermal expansion during operation of the vehicle on the track. Saw cuts 42c are provided to permit expansion of the segments between the cuts. As shown on FIG. 2 and FIG. 5, a suitable shim 46, preferably made of a damping material, is installed between the side load plate 42 and the side load pad 26 on the beam to shim the side load plate into proper position for laterally supporting the half slipper 30.

On the guide plates 36, 38, and 40, a single drilled hole may be used in lieu of 42a and 42b shown on FIG. 4. The guide plates may be tack-welded through the holes in the plates to the slipper shoe 32; thus permitting easy removal when the guide plates are worn thin during use. The saw cuts are particularly useful on the guide plates, not only because of the heat generated during vehicle operation, but because they provide escape routes for wear products.

The beam ends which suport the half slipper assemblies, and have been described as unsymmetrical hexagonal hollow prisms, are covered on the outside with suitable damping material in pad form, such as damping pads 48 and 49, which extend laterally to cover both faces of flat sides 20a on upper plate 20, as shown on FIG. 5. The damping pads, which in their free state are in flat form, may be made of any suitable elastomeric material, such as butyl rubber or neoprene. The damping pads may be held in place by any suitable means, well-known to the art, in order that they remain intact when the slipper assembly is not in position. The half slipper 30 is positioned against the lower side of the beam end, as shown on FIG. 2 and FIG. 3, where it is held in place by means of cap screws 50 which extend through suitable openings in retainer cap 52, damping pad 48, the flat sides 20a of upper plate 20, and damping pad 49, to threadably engage the upper portion of reinforcing ribs 34, as best shown on FIG. 3. The metallic openings through which the cap screws pass are suitably enlarged to permit longitudinal, lateral, and rotary movement of the slipper assembly without contacting or applying shear loading on the shanks of the cap screws. It is thus seen that the slipper assemblies are elastomerically insulated from the beams and from the vehicle joined to the beams.

The structure shown and described may easily be removed at any point along the track by removing the two slippers on one side of the vehicle, which may then be lifted from the track. The lower edge of the side load pad 26 is bent to protect the side load pad 42 and the shim 46 during the operation of lowering the beam onto the slipper assembly when fitting the vehicle to the track.

The operation of gliding track vehicles, using half slipper assemblies in accordance with this invention, has been very successful. Not only are the half slipper assemblies relatively cheap to manufacture and service, but what is more important, the number of test runs which can be made during a given time interval has been increased. Longitudinal, transverse and vertical shock loads are not directly transmitted from the rail to the beam and the vehicle structure. It has been found that the damping pads 48 and 49 may be tuned or adjusted to a frequency range response by a proper selection of material and the amount of compression under which they operate. When necessary or desired, the half slipper assemblies may be provided with suitable blast shields to protect them from the heat generated by the propulsion engine powering the vehicle. Gliding track vehicles, using the half slippers of this invention, have been repeatedly operated, with complete success, at velocities of 2200 feet per second, or 1500 miles per hour.

It is to be understood that the embodiment of the present invention as shown and described is to be regarded as illustrative only and that the invention is susceptible to variations, modifications and changes within the scope of the appended claims.

I claim:

1. For use on a gliding track vehicle operating on dual tracks; a half slipper and beam combination comprising: a beam having a midsection adapted for joining to the track vehicle and having opposing ends for laterally extending from both sides of the track vehicle to be above the ground tracks, the opposing ends each being of a configuration having a hollow cross section normal to the longitudinal axis of said beam and parallel to the ground tracks in the form of an unsymmetrical hexagon with the longest sides at the top and bottom substantially parallel with the top surface on the ground tracks; at least one elastomeric pad substantially surrounding each opposing end of said beam; and two half slipper assemblies each having an elongated slipper shoe for slidably embracing the top and inner side of the upper railhead portion of the adjacent ground track and being in engagement with the bottom and two adjacent external sides on the elastomeric pad surrounding one of the opposing ends on said beam for supporting said beam and a portion of the track vehicle, retainer cap means in engagement with the top and two adjacent external sides on the elastomeric pad surrounding one of the opposing ends on said beam to be adjacent to said slipper shoe, and retaining means joining said retainer cap means and said slipper shoe for resiliently supporting said half slipper assembly on said beam.

2. For use on a gliding track vehicle operating on dual tracks; a half slipper and beam combination comprising: a beam having a midsection adapted for joining to the track vehicle, opposing ends joined to the midsection for laterally extending from both sides of the track vehicle to be above the ground tracks, the opposing ends being of a configuration having a hollow cross section normal to the longitudinal axis of said beam and parallel to the ground tracks in the form of an unsymmetrical hexagon with the longest sides at the top and bottom substantially parallel with the top surface on the ground tracks, and a side load pad joined to the lower portion at each end of the midsection to be adjacent to the opposing ends; at least one elastomeric pad substantially surrounding each opposing end of said beam; and two half slipper assemblies each having an elongated slipper shoe for slidably embracing the top and inner side of the upper railhead portion of the adjacent ground track and abutting for lateral support against the adjacent side load pad on said beam, the elongated slipper shoe further being in engagement with the bottom and two adjacent external sides on the elastomeric pad surrounding one of the opposing ends on said beam for supporting said beam and a portion of the track vehicle, retainer cap means in engagement with the top and two adjacent external sides on the elastomeric pad surrounding one of the opposing ends on said beam to be adjacent to said slipper shoe, and retaining means joining said retainer cap means and said slipper shoe for resiliently supporting said half slipper assembly on said beam.

3. For use on a gliding track vehicle operating on dual tracks; a half slipper and beam combination comprising: a beam having a midsection adapted for joining to the track vehicle, opposing ends joined to the midsection for laterally extending from both sides of the track vehicle to be above the ground tracks, the opposing ends being of a configuration having a hollow cross section normal to the longitudinal axis of said beam and parallel to the ground tracks in the form of an unsymmetrical hexagon with the longest sides at the top and bottom substantially parallel with the top surface on the ground tracks, the opposing ends of the beam each further having two elongated flat side elements laterally extending from substantially the junctions formed by the short sides of the unsymmetrical hexagon cross section and longitudinally extending for substantially the length of the opposing end, and a side load pad joined to the lower portion at each end of the midsection to be adjacent to the opposing ends; a first initially flat elastomeric pad substantially joined to the upper portion of each of the opposing ends of said beam including the upper faces of the two elongated flat side elements thereon; a second initially flat elastomeric pad substantially joined to the lower portion of each of the opposing ends of said beam including the lower faces of the two elongated flat side elements thereon; and two half slipper assemblies each having an elongated slipper shoe for slidably embracing the top and inner side of the upper railhead portion of the adjacent ground track and abutting for lateral support against the adjacent side load pad on said beam, the elongated slipper shoe further being in engagement with substantially the entire lower surface of said second elastomeric pad for supporting said beam and a portion of the track vehicle, retainer cap means in engagement with substantially the entire upper surface of said first elastomeric pad on one of the opposing ends on said beam to be adjacent to said slipper shoe, and retaining means extending through said retainer cap means, said first elastomeric pad, the flat side elements on said beam, said second elastomeric pad, and releasably engaging the slipper shoe for resiliently supporting said half slipper assembly on said beam.

References Cited

UNITED STATES PATENTS 2,724,966 11/1955 Northrop et al. _____ 104—134 X
2,864,318 12/1958 Toulmin _____ 104—134 X ARTHUR L. LA POINT, *Primary Examiner.*

J. E. BABER, *Assistant Examiner.*